3,194,844
CATALYST REGENERATION AND PROCESS
Alvin D. Silber, Riverdale, N.Y., and Jack B. Feder, Dumont, and Joseph L. Russell, Ridgewood, N.J., assignors to Halcon International, Inc., a corporation of Delaware
No Drawing. Filed Apr. 11, 1961, Ser. No. 102,141
3 Claims. (Cl. 260—621)

This invention relates to a process for preparing phenol, and more particularly to a process for converting an impure oxygenated cyclohexane cut or fraction to pure phenol in high yields by catalytic dehydrogenation and distillation, and especially to such a process wherein spent catalyst is regenerated by alkaline treatment and washing the alkaline material therefrom.

Phenol is a very important industrial chemical. It may be prepared by catalytically dehydrogenating cyclohexanone, cyclohexanol or mixtures of the two. However, catalyst life is poor when impure starting materials are used. The art is confronted by the problem of obtaining pure phenol in improved yields and in an economical manner, especially from impure oxygenated cyclohexane material.

The discoveries associated with the invention relating to solution of the above problems and the objects achieved in accordance with the invention as described herein include the provision of:

A process for regenerating a spent metal-on-carbon alcohol dehydrogenation catalyst which comprises removing alkali soluble material therefrom;

Such a process wherein the spent catalyst is treated with an aqueous alkaline solute, and washed until the washings are free of solute;

Such a process wherein treating temperature is within the range between the freezing and boiling temperature of the system;

Such a process wherein the metal is platinum, the treating solution is a 0.1 N solution of sodium hydroxide, and the treated catalyst is washed with distilled water until the washings are free of sodium hydroxide;

Such a process including preparing phenol from a crude oxygenated cyclohexane fraction containing at least one member of the group consisting of cyclohexanone and cyclohexanol by vaporizing this fraction and diluting it with hydrogen in an amount in the range of 1 to 15 mols of hydrogen per mol of total cyclohexanone and cyclohexanol therein, and contacting the resulting mixture with a platinum on carbon catalyst at a temperature in the range of 250° to 425° C. at a liquid space velocity in the range of 0.3 to 2.5 per hour and recovering phenol from the reaction product, the contacting being stopped when the catalyst is spent, and regenerating the spent catalyst;

and other objects which will be apparent in view of details or embodiments of the invention as set forth hereinafter.

In order to indicate still more fully the nature of the present invention, the following examples of typical procedures are set forth, in which parts and percent mean part and percent by weight, respectively, unless otherwise indicated, it being understood that these examples are presented as illustrative only and are not intended to limit the scope of the invention.

*Example 1*

Cyclohexane is subjected to an air oxidation at 150° C. and super atmospheric pressure in the presence of a cobalt naphthenate catalyst so as to give a reaction mixture in which about 10% of the cyclohexane is oxidized. After removal of unreacted cyclohexane, the reaction mixture is vacuum distilled and a cut is obtained as a charge stock for dehydrogenation. This cut contains about 85% of cyclohexanone plus cyclohexanol. Dehydrogenation is accomplished using a 2% platinum-on-carbon catalyst to produce a crude phenol. Pure phenol is recovered therefrom by distillation.

The distillation apparatus used in this example is one-inch diameter, vacuum jacketed, 20 actual plate glass column (Oldershaw) equipped with a time switch operated magnetic reflux splitter condensing head of conventional design, a jacketed distillate receiver, a batch pot and heating mantle, and a vacuum pump and mercury U-tube manometer.

At the start of the oxygenated cyclohexane distillation, the pressure at the top of the column is reduced to about 34 mm. Hg, and the pot is heated to 73° C. (the head is at 60° C.) and the reflux ratio is 1 to 10. These conditions are changed in small increments until the pressure is 20 mm. Hg absolute, the pot temperature is 125° C. (the head temperature is 71° C.) and the reflux ratio is 1 to 20 (reflux to product).

The dehydrogenation step is carried out with the feedstock in the vapor phase, using as a dehydrogenation catalyst platinum (2%) on activated carbon. The cyclohexanol and cyclohexanone feedstock is diluted with added hydrogen (4 to 8 mols of hydrogen per mol of total cyclohexanone and cyclohexanol present). The mixture is contacted with the catalyst at 375° C. and a liquid space velocity of 0.7 per hour. There is recovered 87.4 parts of product per 85 parts of cyclohexanone and cyclohexanol in the charge of feedstock, and this product analyzes 88.6% phenol.

There is a decrease in catalyst activity during 69 hours operation. The conversion drops from about 95% down to less than 20%. Selectivity to phenol remains at greater than 90%. This spent catalyst also gives a low conversion with a 1 to 1 mixture of cyclohexanone plus cyclohexanol both of which are pure, when tested under similar conditions.

This catalyst is then boiled in a 0.1 N sodium hydroxide solution for approximately 2 hours and then washed to a neutral pH with distilled water. After drying, this treated catalyst is charged to a reactor and 1 to 1 mixture of cyclohexanol and cyclohexanone is treated at the above mentioned conditions. The conversion is more than 98% of the mixture fed. A selectivity of phenol formation of more than 90% on a weight basis is obtained.

This clearly shows a complete restoration or regeneration of the initial catalyst activity level as a result of treatment with the basic solution and washing.

Usual reactivation methods such as treatment with steam, e.g., when passed over the deactivated catalyst at a temperature of 500° C. for 2 hours, do not regenerate the catalyst.

Pure phenol (exceeding the USP freeze point specification) is obtained from the above mentioned product by vacuum distillation in a 30 plate column of the above described type further equipped with a condensing head having a decanter tube (Dean-Stark), using a reflux ratio of 33 to 1, a pot temperature of about 113° C., and a head temperature of 99° C.

*Example 2*

About 25 grams of deactivated catalyst (obtained as in Example 1) is first boiled in twice its weight of distilled water for 15 minutes. Twenty-five milliliters of 0.1 N ammonium hydroxide is then added thereto and the catalyst is boiled therein for an additional 15 minutes. An additional 25 ml. of distilled $H_2O$ is added to the basic mixture (to provide for evaporation loss) and boiling is contained for one hour. Then the catalyst particles are separated from the liquid.

Next they are subjected to an additional one hour of boiling in 50 ml. of 0.1 N ammonium hydroxide, separated from the liquid, washed with distilled water until the washings are neutral, and dried overnight in an oven at 110° C. Then they are returned to the reactor, reduced with $H_2$ at 375° C. for about 24 hours, and used for dehydrogenation. The results are similar to those obtained with fresh catalyst.

In place of the alkaline materials already shown, aqueous solutions of other substances characterized broadly as capable of reacting with organic acids may be employed such for example, as $NaHCO_3$, $Na_2CO_3$, ethanol amine, triethanol amine, pyridine, quaternary alkyl ammonium hydroxides, and the like. Solutions containing any of these added substances are herein designated as alkaline solutions although they may range in pH upward from 6.0. The aqueous solution should contain at least 0.01% of the solute and only convenience in handling limits its upper concentrations.

Regeneration in accordance with the invention is equally applicable to other spent metal-dehydrogenation catalysts supported on carbon or the like, including palladium, ruthenium, rhodium, nickel, cobalt and the like.

The spent catalysts may have been used for converting cyclohexanol and cyclohexanone to phenol, or analogously dehydrogenating methyl cyclohexanol and methyl cyclohexanone to cresols, and generally, alkyl cyclohexanols and alkyl cyclohexanones to corresponding alkyl phenols.

The regeneration may be carried out without removing the catalysts from the reactor providing the latter is not adversely affected by the treating solution, e.g., if the surfaces contacted by the solution are corrosion resistant.

As indicated, the dehydrogenation step is carried out in the presence of (added) hydrogen, with the feedstock in the vapor phase, using a dehydrogenation catalyst. The mixture of hydrogen, cyclohexanol and cyclohexanone is contacted with the dehydrogenation catalyst, such as 0.5 to 5% platinum on carbon or equivalent material, in a zone maintained at a temperature in the range of from about broadly 250° to 425° C. desirably 325° to 400° C. and preferably 340° to 385° C., at a liquid hourly space velocity of broadly from about 0.3 to 2.5, desirably 0.6 to 1 and preferably 0.7 to 0.8. The mol ratio of hydrogen is in the range of 1 to 15, and desirably 4 to 8 mols of hydrogen per mol of total cyclohexanol and cyclohexanone. Under these conditions there is little or no production of either benzene or cyclohexene.

The process of this invention is adapted for use in connection with the overall process for the preparation of phenol from cyclohexane or benzene, e.g. as set forth more fully in the U.S. patent application of Alfred Saffer and Rex E. Lidov, Serial No. 29,816, filed on May 18, 1960, and now abandoned, or the phenol distillation may be carried out in two steps, phenol and lower boiling material being separated from the higher boiling in the first step, and lower boiling material being separated from the phenol in the second, as set forth more fully in the U.S. patent application of Jack B. Feder and Joseph L. Russell, Serial No. 35,127, filed on June 10, 1960, now issued Patent 3,140,243.

In view of the foregoing disclosures, variations and modifications thereof will be apparent to one skilled in the art and it is intended to include within the invention all such variations and modifications except as do not come within the scope of the appended claims.

What is claimed is:

1. A process for the regeneration of a spent metal-on-carbon catalyst previously used in the vapor phase dehydrogenation of a compound selected from the group consisting of cyclohexanol, cyclohexanone, alkyl cyclohexanol, alkyl cyclohexanone, and mixtures to produce the corresponding phenol which comprise contacting at a temperature between the freezing and boiling temperature of the system the spent catalyst with an aqueous alkaline solution containing at least 0.01% alkaline material, washing the catalyst after treatment with the alkaline solution with water until the wash water is substantially free of the alkaline material, and recovering regenerated catalyst.

2. A process for the regeneration of a spent platinum-on-carbon previously used in the vapor phase dehydrogenation of a compound selected from the group consisting of cyclohexanol, cyclohexanone, alkyl cyclohexanol, alkyl cyclohexanone, and mixtures to produce the corresponding phenol which comprises boiling the spent catalyst with aqueous 0.1 N sodium hydroxide solution, for about 2 hours, washing the catalyst after treatment with the sodium hydroxide, with water until the wash water is free of sodium hydroxide and recovering regenerated catalyst.

3. A process for the preparation of phenol from a crude oxygenated cyclohexane fraction containing at least one member of the group consisting of cyclohexanol and cyclohexanone which comprises vaporizing said fraction, diluting said fraction with hydrogen in an amount in the range of 1 to 15 mols of hydrogen per mol of total cyclohexanone and cyclohexanol, contacting the resulting mixture with a platinum-on-carbon catalyst at a temperature in the range of 250 to 425° C. at a liquid hourly space velocity in the range of 0.3 to 2.5 per hour and recovering phenol from the reaction product, discontinuing said contacting when the catalyst is spent, contacting the spent catalyst at a temperature between the freezing and boiling temperature of the system with aqueous alkaline solution containing at least 0.01% alkaline material, separating said solution from said catalyst and reusing the thusly treated catalyst after washing with water until the wash water is substantially free of the alkaline material in the further production of phenol.

References Cited by the Examiner

UNITED STATES PATENTS

| | | | |
|---|---|---|---|
| 1,074,337 | 9/13 | Wijnberg | 252—412 |
| 2,503,641 | 4/50 | Taylor et al. | 260—621 |
| 2,925,391 | 2/60 | Lait et al. | 252—412 X |

LEON ZITVER, *Primary Examiner.*

CHARLES B. PARKER, *Examiner.*